United States Patent
Zhang (10) Patent No.: US 11,741,046 B2
(45) Date of Patent: Aug. 29, 2023

(54) METHOD AND APPARATUS FOR CREATING SYSTEM DISK SNAPSHOT OF VIRTUAL MACHINE

(71) Applicant: BEIJING BAIDU NETCOM SCIENCE AND TECHNOLOGY CO., LTD., Beijing (CN)

(72) Inventor: Yu Zhang, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 1106 days.

(21) Appl. No.: 15/239,533

(22) Filed: Aug. 17, 2016

(65) Prior Publication Data

US 2017/0124103 A1 May 4, 2017

(30) Foreign Application Priority Data

Oct. 28, 2015 (CN) .......................... 201510712881.4

(51) Int. Cl.
*G06F 16/11* (2019.01)
*G06F 16/16* (2019.01)
(Continued)

(52) U.S. Cl.
CPC ........ *G06F 16/128* (2019.01); *G06F 9/45558* (2013.01); *G06F 11/1446* (2013.01);
(Continued)

(58) Field of Classification Search
CPC .... G06F 16/128; G06F 16/166; G06F 16/188; G06F 9/45558; G06F 11/1446; G06F 11/1464; G06F 11/1469
See application file for complete search history.

(56) References Cited

U.S. PATENT DOCUMENTS 8,943,281 B1 * 1/2015 Stringham .......... G06F 11/1469
711/162
10,146,631 B1 * 12/2018 Pradeep .............. G06F 11/1471
(Continued)

FOREIGN PATENT DOCUMENTS

| CN | 103885854 A | | 6/2014 |
|---|---|---|---|
| CN | 104714755 A | * | 6/2015 |
| JP | 2014-006845 A | | 1/2014 |

OTHER PUBLICATIONS

Google Patents English Language Translation of Ye (Year: 2013).*
(Continued)

*Primary Examiner* — Apu M Mofiz
*Assistant Examiner* — Farhad Agharahimi
(74) *Attorney, Agent, or Firm* — Marshall, Gerstein & Borun LLP (57) ABSTRACT

A method and apparatus for creating a system disk snapshot of a virtual machine comprises: receiving an instruction for creating a snapshot of a virtual machine; determining existence of a power-on state; renaming a top file in a system disk in response to the received instruction if the power-on state exists; creating a new top file in response to renaming the top file, directing dependency of the new top file to the renamed top file and opening the new top file; determining whether a preceding snapshot is created successfully; using the renamed top file as a first snapshot file if the preceding snapshot is successful; and uploading the first snapshot file to a file management server. Accordingly, when a system disk snapshot is created in a power-on state, the snapshot may be created without stopping the virtual machine, thereby reducing requirements for data back up, storage space, and network bandwidth.

20 Claims, 6 Drawing Sheets

(51) Int. Cl.
*G06F 16/188* (2019.01)
*G06F 11/14* (2006.01)
*G06F 9/455* (2018.01)

(52) U.S. Cl.
CPC ...... *G06F 11/1464* (2013.01); *G06F 11/1469* (2013.01); *G06F 16/166* (2019.01); *G06F 16/188* (2019.01); *G06F 2009/45562* (2013.01); *G06F 2009/45583* (2013.01); *G06F 2201/84* (2013.01)

(56) References Cited

U.S. PATENT DOCUMENTS

| | | | |
|---|---|---|---|
| 2010/0023716 A1 | 1/2010 | Nemoto et al. | |
| 2010/0299309 A1* | 11/2010 | Maki | G06F 11/1479 718/1 |
| 2012/0066677 A1* | 3/2012 | Tang | G06F 9/4856 718/1 |
| 2013/0167148 A1 | 6/2013 | Lee et al. | |
| 2014/0074793 A1* | 3/2014 | Doering | G06F 16/113 707/667 |
| 2014/0229698 A1* | 8/2014 | Sivasubramanian | G06F 12/02 711/170 |
| 2015/0081994 A1* | 3/2015 | Christopher | G06F 11/1458 711/162 |
| 2015/0242283 A1* | 8/2015 | Simoncelli | G06F 11/1456 711/162 |
| 2016/0366233 A1* | 12/2016 | Le | H04L 67/02 |

OTHER PUBLICATIONS ("Snapshotting with libvirt for qcow2 images", https://kashyapc.wordpress.com/2011/10/04/snapshotting-with-libvirt-for-qcow2-images/, Oct. 2011) (Year: 2011).*

* cited by examiner

METHOD AND APPARATUS FOR CREATING SYSTEM DISK SNAPSHOT OF VIRTUAL MACHINE

CROSS-REFERENCE TO RELATED APPLICATION

This application is related to and claims priority from Chinese Application No. 201510712881.4, filed on Oct. 28, 2015, entitled "METHOD AND APPARATUS FOR CREATING SYSTEM DISK SNAPSHOT OF VIRTUAL MACHINE", the entire disclosure of which is hereby incorporated by reference.

TECHNICAL FIELD

The present application relates to the field of computer technology, in particular to the field of virtual machine technology, and more particularly, to a method and an apparatus for creating a system disk snapshot of a virtual machine.

BACKGROUND

Generally, the method for creating a virtual machine snapshot in the prior art creates a snapshot by using an internal disk snapshot technology, so as to acquire the disk state at the snapshot time.

Using this method, a virtual machine snapshot may be created in either the power-on state or the power-off state of the virtual machine. For example, in the virtual machine of the qemu-kvm hardware virtualization technology type, a "qemu-img" command is used to create a cold-snapshot of a disk in the power-off state, and a "savevm" command is used to create a live-snapshot of a disk in the power-on state.

However, the method for creating a system disk snapshot of a virtual machine copies the memory state while creating the snapshot, and the data and snapshots are all stored in individual files in the qcow2 format. Therefore, there exist the following problems. If the snapshot is created when the virtual machine is powered off, the operating efficiency of the virtual machine is impacted. If the snapshot is created when the virtual machine is in the power-on state, the size of the created snapshot file is the same as that of the disk file of the virtual machine, which results in a large amount of backup data, a large occupied storage space, and large occupied network bandwidth during uploading.

SUMMARY

An objective of the present application is to provide an improved method and apparatus for creating a system disk snapshot of a virtual machine, so as to solve the technical problems mentioned in the background.

In the first aspect, the present application provides a method for creating a system disk snapshot of a virtual machine, comprising: receiving an instruction for creating a snapshot of a virtual machine; determining whether the virtual machine is in a power-on state; renaming a top file in files of a system disk of the virtual machine in response to the received instruction if the virtual machine is in the power-on state; creating a new top file in response to completion of renaming the top file, directing dependency of the created new top file to the renamed top file, and opening the created new top file; determining whether a preceding snapshot is created successfully; using the renamed top file as a first snapshot file if the preceding snapshot is created successfully; and uploading the first snapshot file to a file management server.

In some embodiments, the method further comprises: determining whether the renamed top file depends on a historical snapshot file, in response to successful uploading; combining the renamed top file with the historical snapshot file to form a new historical snapshot file, if the renamed top file depends on the historical snapshot file; and modifying the dependency of the created new top file to be directed to the new historical snapshot file, and reopening the created new top file.

In some embodiments, the combining of the renamed top file with the historical snapshot file to form a new historical snapshot file comprises: backing up the renamed top file and the historical snapshot file as source files; determining whether dependency relationship of the backed up files and dependency relationship of the source files comply with each other; modifying the dependency relationship of the backed up files to comply with the dependency relationship of the source files, if the dependency relationships do not comply with each other; combining the backed up files to obtain the new historical snapshot file, if the dependency relationships comply with each other; and deleting the source files.

In some embodiments, the determining of whether a preceding snapshot is created successfully comprises: extracting a unique identifier of each depended files; determining whether the unique identifier exists in a snapshot list of a database of the uploaded files; determining that the preceding snapshot is created successfully, if the unique identifier exists; and determining that the preceding snapshot is created unsuccessfully, if the unique identifier does not exist.

In some embodiments, the method further comprises: combining the renamed top file generated during creation of the preceding snapshot with the renamed top file generated during creation of the current snapshot to form a second snapshot file, if the preceding snapshot is created unsuccessfully; and uploading the second snapshot file to the file management server.

In some embodiments, the method further comprises: copying the top file in the files of the system disk of the virtual machine to obtain a third snapshot file, in response to the received instruction, if the virtual machine is powered off; and uploading the third snapshot file to the file management server.

In some embodiments, the method further comprises: receiving a snapshot rollback instruction; downloading a snapshot file in accordance with the snapshot rollback instruction from the file management server, in response to the received snapshot rollback instruction; and combining downloaded snapshot file, if a plurality of snapshot files are downloaded.

In some embodiments, the receiving of a snapshot rollback instruction comprises: presenting an interface for selecting a rollback instruction; receiving a first selection operation on the rollback instruction; presenting an interface for selecting a rollback time in response to the received first selection operation; and receiving a second selection operation on the rollback time; and the downloading of a snapshot file in accordance with the snapshot rollback instruction from the file management server, in response to the received snapshot rollback instruction comprises: downloading a snapshot file in accordance with the second selection operation from the file management server, in response to the received second selection operation.

In some embodiments, the virtual machine is a virtual machine created based on a qemu-kvm hardware virtualization technology through an open-source OpenStack cloud computing management platform architecture; and a file format of the system disk of the virtual machine has a qcow2 format link structure.

In some embodiments, a link length of files in the system disk is not greater than 4.

In the second aspect, the present application provides an apparatus for creating a system disk snapshot of a virtual machine, comprising: a first receiving unit, configured to receive an instruction for creating a snapshot of a virtual machine; a first determining unit, configured to determine whether the virtual machine is in a power-on state; a naming unit, configured to rename a top file in files of a system disk of the virtual machine in response to the received instruction if the virtual machine is in the power-on state; a creating unit, configured to create a new top file in response to completion of renaming the top file, to direct dependency of the created new top file to the renamed top file, and to open the created new top file; a second determining unit, configured to determine whether a preceding snapshot is created successfully; a determination unit, configured to use the renamed top file as a first snapshot file if the preceding snapshot is created successfully; and a first uploading unit, configured to upload the first snapshot file to a file management server.

In some embodiments, the apparatus further comprises: a third determining unit, configured to determine whether the renamed top file depends on a historical snapshot file, in response to successful uploading; a first combining unit, configured to combine the renamed top file with the historical snapshot file to form a new historical snapshot file, if the renamed top file depends on the historical snapshot file; and a modifying unit, configured to modify the dependency of the created new top file to be directed to the new historical snapshot file, and to reopen the created new top file.

In some embodiments, the first combining unit comprises: a backing up sub-unit, configured to back up the renamed top file and the historical snapshot file as source files; a determining sub-unit, configured to determine whether dependency relationship of the backed up files and dependency relationship of the source files comply with each other; a modifying sub-unit, configured to modify the dependency relationship of the backed up files to comply with the dependency relationship of the source files, if the dependency relationship of the backed up files does not comply with that of the source files; a combining sub-unit, configured to combine the backed up files to obtain the new historical snapshot file, if the dependency relationship of the backed up files complies with that of the source files; and a deleting sub-unit, configured to delete the source files.

In some embodiments, the second determining unit comprises: an extracting sub-unit, configured to extract a unique identifier of each depended files; a determining sub-unit, configured to determine whether the unique identifier exists in a snapshot list of a database of the uploaded files; a first determining sub-unit, configured to determine that the preceding snapshot is created successfully, if the unique identifier exists in the snapshot list of the database of the uploaded files; and a second determining sub-unit, configured to determine that the preceding snapshot is created unsuccessfully, if the unique identifier does not exist in the snapshot list of the database of the uploaded files.

In some embodiments, the apparatus further comprises: a second combining unit, configured to combine the renamed top file generated during creation of the preceding snapshot with the renamed top file generated during creation of the current snapshot to form a second snapshot file, if it is determined that the preceding snapshot is created unsuccessfully; and a second uploading unit, configured to upload the second snapshot file to the file management server.

In some embodiments, the apparatus further comprises: a copying unit, configured to copy the top file in the files of the system disk of the virtual machine to obtain a third snapshot file, in response to the received instruction, if the virtual machine is powered off; and a third uploading unit, configured to upload the third snapshot file to the file management server.

In some embodiments, the apparatus further comprises: a second receiving unit, configured to receive a snapshot rollback instruction; a downloading unit, configured to download a snapshot file in accordance with the snapshot rollback instruction from the file management server, in response to the received snapshot rollback instruction; and a third combining unit, configured to combine downloaded snapshot file, if a plurality of snapshot files are downloaded.

In some embodiments, the second receiving unit comprises: a first presenting sub-unit, configured to present an interface for selecting a rollback instruction; a first receiving sub-unit, configured to receive a first selection operation on the rollback instruction; a second presenting sub-unit, configured to present an interface for selecting a rollback time in response to the received first selection operation; and a second receiving sub-unit, configured to receive a second selection operation on the rollback time; and the downloading unit comprises: a downloading sub-unit, configured to download a snapshot file in accordance with the second selection operation from the file management server, in response to the received second selection operation.

In some embodiments, the virtual machine in the apparatus is a virtual machine created on basis of a qemu-kvm hardware virtualization technology through an open-source OpenStack cloud computing management platform architecture; and a file format of the system disk of the virtual machine in the apparatus is in a link structure of a qcow2 format.

In some embodiments, a link length of files in the system disk is not greater than 4.

The present application provides a method and an apparatus for creating a system disk snapshot of a virtual machine, and the comprises: receiving an instruction for creating a snapshot of a virtual machine; determining whether the virtual machine is in a power-on state; renaming a top file in files of a system disk of the virtual machine in response to the received instruction if the virtual machine is in the power-on state; creating a new top file in response to completion of renaming the top file, directing dependency of the created new top file to the renamed top file, and opening the created new top file; determining whether a preceding snapshot is created successfully; using the renamed top file as a first snapshot file if the preceding snapshot is created successfully; and uploading the first snapshot file to a file management server. According to the method and apparatus, when a system disk snapshot of a virtual machine is created in a power-on state of the virtual machine, the snapshot may be created without the need of stopping the operation of the virtual machine, thereby reducing the data amount to be backed up and the occupied storage space for creating the snapshot, and reducing the occupied network bandwidth for uploading the snapshot.

BRIEF DESCRIPTION OF THE DRAWINGS

After reading detailed descriptions of non-limiting embodiments with reference to the following accompanying drawings, other features, objectives and advantages of the present application will be more apparent.

DETAILED DESCRIPTION

Hereinafter, the embodiments of the present application will be described in conjunction with the accompanying drawings. It should be understood that the specific embodiments are merely used for illustrating the application, without making limitations thereto. Further, to facilitate the description of the application, only portions related to the application are shown in the drawings.

Moreover, the embodiments in the present application, as well as the features in the embodiments, may be combined with each other if there is no conflict. Hereinafter, the present application will be described in details according to the accompanying drawings in conjunction with the embodiments.

Figure 1:
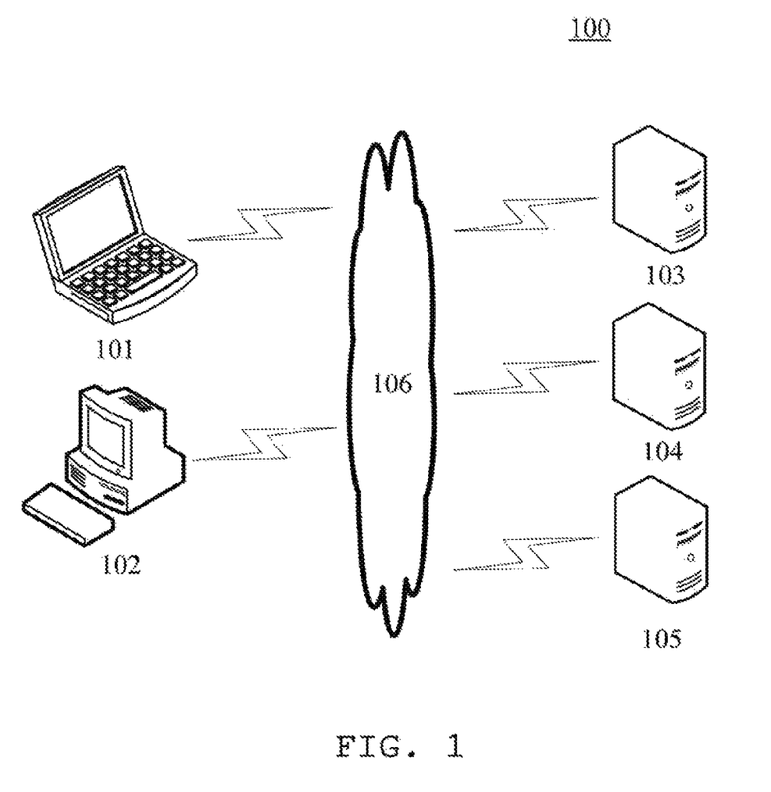
FIG. 1 is a diagram showing an exemplary system architecture in which the present application can be applied.

FIG. 1 illustrates an exemplary system architecture 100 which may be used by the method and apparatus for creating a system disk snapshot of a virtual machine using the embodiments of the present application.

As shown in FIG. 1, the system architecture 100 may include, but not be limited to, terminal devices 101 and 102, a cloud computing platform including servers 103, 104 and 105, and a network 106. The network 106 is configured to provide communication links between the terminal devices 101 and 102 and the cloud computing platform, or between the servers 103, 104 and 105 in the cloud computing platform. The network 106 may provide various connection types, such as wired or wireless communication links, optical fiber cables.

A user may manage, through the terminal devices 101 and 102, a virtual machine running on the cloud computing platform, for example, submit a request for creating a virtual machine snapshot and the like. The virtual machine may be set up on any server or a combination of servers in the cloud computing platform, for example, on the server 103, 104 or 105. The virtual machine may be installed with various applications, such as a web page browser application, a shopping application, a search application, an instant communication tool, a mail client, and a social platform software.

The servers 103, 104 and 105 forming the cloud computing platform may be devices providing various computing services, for example, receiving a request submitted by the user through a terminal device, analyzing the request, and returning a processing result to the user through the terminal device.

It should be noted that, the method for creating a system disk snapshot of a virtual machine provided in the embodiment of the present invention is generally executed by using a virtual machine management module deployed in the above-mentioned cloud computing platform architecture, and the management module may be deployed in any server or a combination of servers in the cloud computing platform. For example, the management module may be a Nova-compute computing component in an OpenStack cloud computing management platform architecture and may be deployed in any server 103, 104 or 105, or in any combination of the servers 103, 104 and 105. Accordingly, the apparatus for creating a system disk snapshot of a virtual machine is also deployed in any server or a combination servers in the cloud computing platform.

A person skilled in the art should understand that the numbers of the terminal devices, the networks and the servers in FIG. 1 are merely illustrative. Following practical requirements, any numbers of the terminal devices, networks and servers may be provided.

Figure 2:
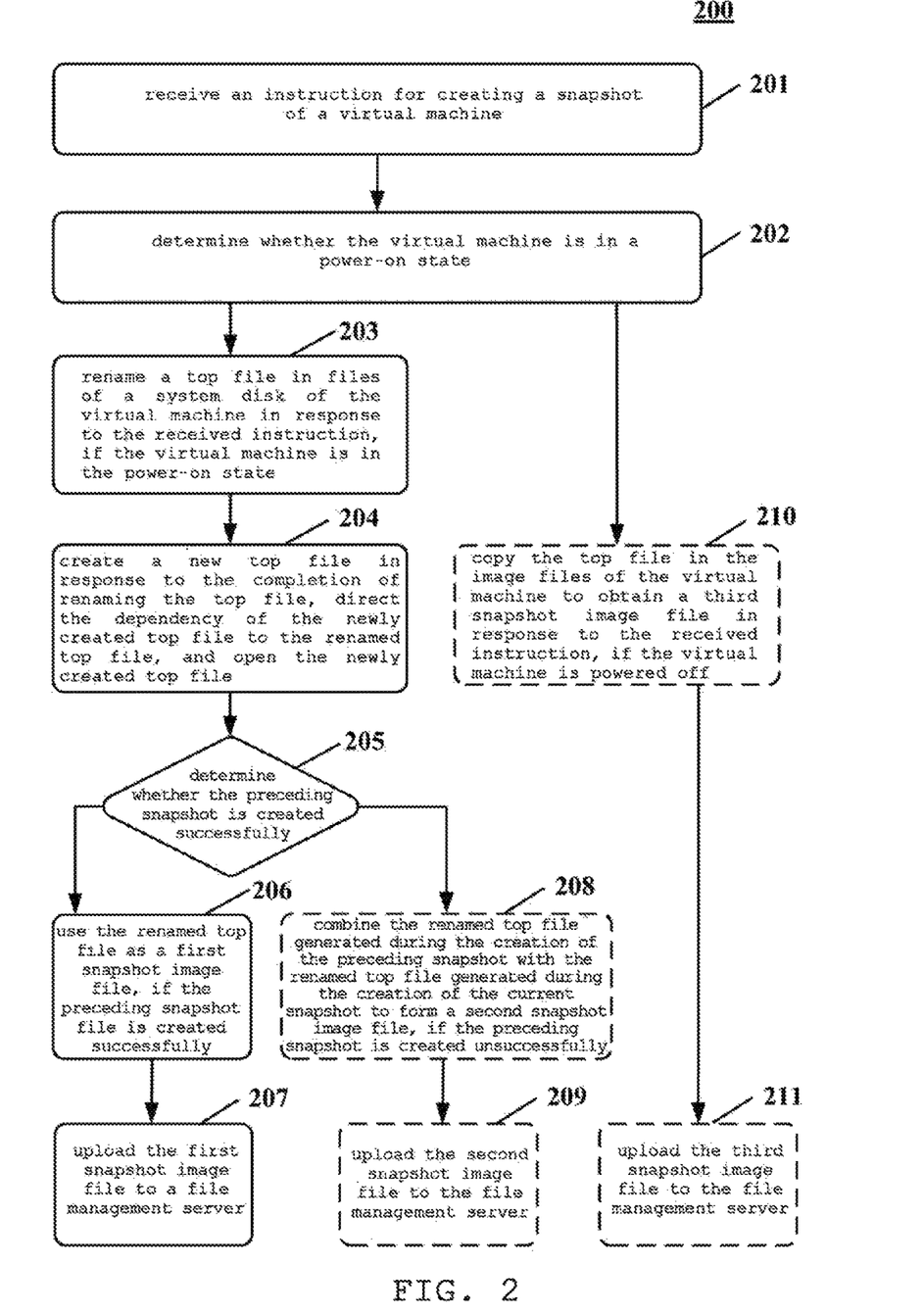
FIG. 2 shows a schematic flow chart of a method for creating a system disk snapshot of a virtual machine according to an embodiment of the present application.

FIG. 2 illustrates a schematic flow chart of a method for creating a system disk snapshot of a virtual machine according to an embodiment of the present application. As shown in FIG. 2, a method 200 for creating a system disk snapshot of a virtual machine includes the following steps.

In step 201, an instruction for creating a snapshot of a virtual machine is received.

In this embodiment, a virtual machine management module (for example, the virtual machine management module deployed in the server shown in FIG. 1) on which the method for creating a system disk snapshot of a virtual machine runs may receive an instruction for creating a virtual machine snapshot from a user using a terminal with which a virtual machine snapshot is created, generally through a wired or a wireless connection. The instruction for creating the virtual machine snapshot may include a universally unique identifier (UUID) of the virtual machine, so as to indicate which virtual machine running on the cloud computing platform the virtual machine snapshot is created for.

Generally, when the user submits an instruction for creating a virtual machine snapshot to the virtual machine management module by using a web page browser or a client application installed on a terminal, the instruction for creating the virtual machine snapshot may be submitted to the virtual machine management module by directly inputting the instruction or clicking a link presented by the web page browser or the client application.

The virtual machine may be a virtual machine that is generated by using the virtualization technology and runs on a physical machine of the cloud computing platform. For example, a qume-kvm type of virtual machine is a complete computer system that is simulated by software, has a complete hardware system functionality, and runs in a completely isolated environment.

The storage of the virtual machine may be a hybrid storage. For example, the data associated with the operating system running on the virtual machine (also referred to as the system disk data) may be stored in the physical machine, and the data accessed by the virtual machine during its operation (also referred to as the data disk data) may be stored in a shared storage device.

In some virtual machine architectures, the data disk itself may generate a snapshot. Therefore, in this embodiment, only the method for creating a system disk snapshot of a virtual machine is described.

In step 202, whether the virtual machine is in a power-on state is determined.

In this embodiment, the virtual machine management module, on which the method for creating a system disk snapshot of a virtual machine runs, determines whether the virtual machine is in the power-on state, in response to the received instruction for creating. For example, a Nova-compute computing component in an OpenStack cloud computing management platform architecture runs on a control node to process a request for creating a virtual machine snapshot of an application programming interface (API), which is sent by a terminal. The request does not differentiate between the power-off snapshot and the power-on snapshot. The Nova-compute computing component determines, through the state of an instance (namely, the virtual machine), whether the snapshot is a power-off snapshot or a power-on snapshot. If it is a power-off snapshot, a power-off snapshot interface is invoked to perform a cold-snapshot. If it is a power-on snapshot, a virtual machine interface is invoked to perform a live-snapshot.

In step 203, if the virtual machine is in the power-on state, a top file in files of a system disk of the virtual machine is renamed in response to the received instruction.

In this embodiment, the files in the system disk of the virtual machine have a linked structure. Generally, the files of the system disk include at least a base file and a top file, and may also include historical snapshot files between the base file and the top file. The base file refers to an original system installation file of the virtual machine or an incremental file generated by adding a system patch to the original system installation file, that is, an image file of the virtual machine.

When the virtual machine is in the power-on state and receives an instruction for creating a virtual machine snapshot, it is possible that an input/output port is performing a continuous writing. Then, the top file in files in the system disk of the virtual machine may be renamed by the virtual machine management module. For example, when a qemu-kvm type the virtual machine process is running continuously, an opened file named "device" is still a qcow2 file before the snapshot process. If it is needed to be switched to a new incremental differential file, a nova-compute process may be used to modify an opened file descriptor, so as to rename the top file named "disk".

In step 204, a new top file is created in response to the completion of renaming the top file, the dependency of the newly created top file is directed to the renamed top file, and the newly created top file is opened.

In this embodiment, in response to the completion of renaming the top file, the virtual machine management module may invoke a virtualization technology interface of the virtual machine to generate a new top file, invoke the virtualization technology interface of the virtual machine to modify dependency of the newly created top file to direct to the renamed top file, and then invoke the virtualization technology interface of the virtual machine to open the created new top file. For example, the above-mentioned Nova-compute process may create a new top file by invoking an API of a libvirt, modify the dependency of the created top file to direct to the renamed top file by invoking the API of the libvirt, and then implement a reopen command to open the created disk file by invoking the API of the libvirt. The libvirt is a C function library that is free and open-source and supports mainstream virtualization tools in Linux.

In this embodiment, the dependency between the created top file and the renamed top file refers to a semantic connection relationship between the created top file and the renamed top file. The renamed top file is independent from the created top file, while the created top file depends on the renamed top file. If the renamed top file is changed, the created top file depending on the renamed top file will be affected.

In step 205, it is to determine whether the preceding snapshot is created successfully.

In this embodiment, after a snapshot of the virtual machine is created successfully, it may be determined whether the preceding snapshot is created successfully according to whether the renamed top file and the file on which the renamed top file depends are uploaded snapshot files.

In some alternative implementations of this embodiment, the determining of whether a preceding snapshot is created successfully includes, but not limited to: extracting a unique identifier of each depended files; determining whether the unique identifier exists in a snapshot list of a database of the uploaded files; determining that the preceding snapshot is created successfully, if the unique identifier exists; and determining that the preceding snapshot is created unsuccessfully, if the unique identifier does not exist.

In step 206, the renamed top file is used as a first snapshot file, if the preceding snapshot file is created successfully.

In this embodiment, after the virtual machine management module invokes a virtual machine process to open the created top file, the renamed top file is a read-only file. Therefore, opening and uploading the read-only file by the virtual machine management module will not affect the normal operation of the virtual machine.

In step 207, the first snapshot file is uploaded to a file management server.

In this embodiment, the virtual machine management module may upload the first snapshot file to the file management server. The file management server may be one of the servers forming the cloud computing platform, and may be configured to store and manage generated snapshot files.

In some alternative implementations of this embodiment, the method for creating a system disk snapshot of a virtual machine may further include, but not limited to, the following steps.

In step 208, the renamed top file generated during the creation of the preceding snapshot is combined with the renamed top file generated during the creation of the current snapshot to form a second snapshot file, if the preceding snapshot is created unsuccessfully.

In step 209, the second snapshot file is uploaded to the file management server.

For example, after a snapshot of the virtual machine is created first (regardless whether the snapshot is uploaded successfully), the link length of files in the system disk of the virtual machine in the qcow2 format increases to 3. After the above-mentioned Nova-compute process invokes the API of the libvirt to reopen a new top file in the qcow2 format by using the process of the qemu-kvm virtual machine, if the Nova-compute process realizes that the preceding virtual machine snapshot is created unsuccessfully, the API of the libvirt is invoked to perform a qemu-img commit operation to combine the snapshots, so as to combine the renamed top file Disk.snp1.delta generated during the preceding snapshot creation with the renamed top file Disk.snap2 generated during the current snapshot creation to form a second snapshot file "snap2". Then, the "snap2" is uploaded to the file management server, and the metadata describing the "snap2" is uploaded to a Glance component in the OpenStack architecture.

The reasons of the failure to create the virtual machine snapshot are mainly the following.
1) The disk space is not sufficient during the backup, causing a backup failure;
2) the combination is failed and an error is returned; and
3) the snapshot file is uploaded unsuccessfully.

After the preceding snapshot of the virtual machine is created unsuccessfully, since the process of reopening the top file by the virtual machine is completed and the virtual machine is running, the link structure will not be returned to ensure the non-awareness of the user. To avoid omitting the data regarding the preceding virtual machine snapshot creation, in response to the currently received instruction to create the virtual machine snapshot, the virtual machine management module may check whether the preceding virtual machine snapshot is created successfully through the following steps: extracting a UUID from the name of each dependent file; searching in a database snapshot list to determine whether the UUID exists; the preceding online snapshot process is successful if the UUID exists, otherwise the preceding online snapshot is failed; combining the previously failed snapshot file with the currently created virtual machine snapshot file if it is determined that the preceding online snapshot is failed, and using a second snapshot file obtained through the combination as the snapshot data to be uploaded.

In the above-mentioned method for creating a system disk snapshot of a virtual machine in the alternative implementation, in order to avoid an excessive link length of the system disk file of the virtual machine to impact the read and write performance and occupying too much disk space of the physical machine, the snapshot file of the failed preceding virtual machine snapshot creation and the currently generated snapshot file are combined with each other to ensure that the length of the file structure link is in a certain range. The combined snapshot file is uploaded to avoid omitting the data of the preceding virtual machine snapshot creation, thereby ensuring the completeness of the snapshot data.

In some alternative implementations of this embodiment, the method for creating a system disk snapshot of a virtual machine may further include, but not limited to, the following steps.

In step 210, if the virtual machine is powered off, the top file in the files of the system disk of the virtual machine is copied to obtain a third snapshot file, in response to the received instruction.

In step 211, the third snapshot file is uploaded to the file management server.

For example, the Nova-compute process invokes the API of the libvirt to back up by directly using a copy command, or to operate disk files (disk files in the qcow2 format) in the physical machine in which the virtual machine locates. Therefore, the system disk snapshot of the virtual machine can be created in the power-off state of the virtual machine.

A person skilled in the art should understand that the first snapshot file, the second snapshot file and the third snapshot file merely refer to snapshot files generated in three different cases in the embodiments of the present application. The first snapshot file is the top file renamed during the current snapshot creation after the preceding snapshot file is created successfully, the second snapshot file is the snapshot file obtained by combining the renamed top file generated in the preceding snapshot creation and the renamed top file generated in the current snapshot creation after the preceding snapshot creation is failed, and the third snapshot file is the snapshot file obtained by copying the top file in the system disk files of the virtual machine in the power-off state of the virtual machine. The terms first, second and third are not intended to particularly limit the snapshot file.

Figure 3:
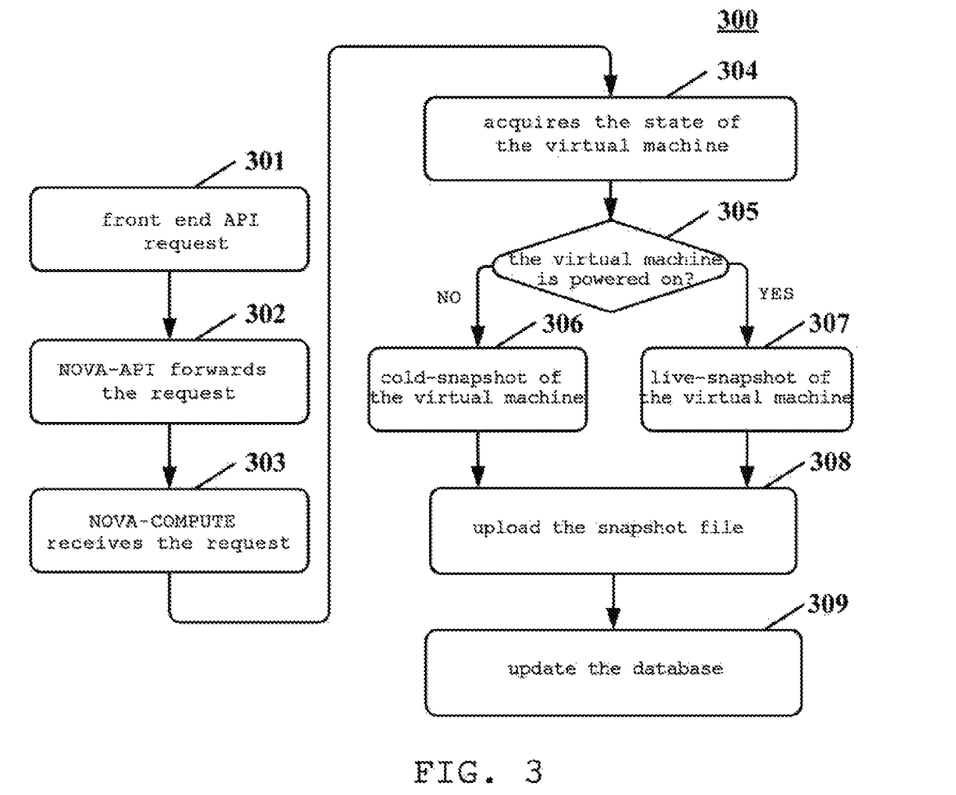
FIG. 3 shows a schematic flowchart of an application scenario of the method for creating a system disk snapshot of a virtual machine according to an embodiment of the present application.

FIG. 3 shows a schematic flowchart of an application scenario of the method for creating a system disk snapshot of a virtual machine according to an embodiment of the present application. The process 300 shown in FIG. 3 includes the following steps.

In step 301, the front end API of the computing component Nova in the OpenStack technical architecture receives from a user a request for creating a virtual machine snapshot, and then executes step 302.

In step 302, the API forwards the request to a message queue, and then step 303 is performed.

In step 303, the Nova-Compute receives the request from the message queue, and then executes step 304.

In step 304, the Nova-Compute acquires the state of the virtual machine, and then executes step 305.

In step 305, the Nova-Compute determines whether the virtual machine is powered on; if not, executes step 307; and if yes, executes step 306.

In step 306, the Nova-Compute creates a cold-snapshot of the virtual machine, and then executes step 308.

In step 307, the Nova-Compute creates a live-snapshot of the virtual machine, and then executes step 308.

In step 308, the Nova-Compute uploads the created snapshot to the file management server, and then executes step 309.

In step 309, the Nova-Compute updates the database, for example, updates the dependency of the snapshot or the time of the snapshot.

According to the method for creating a system disk snapshot of a virtual machine provided in this embodiment of the present application, when a system disk snapshot of a virtual machine is created in a power-on state of the virtual machine, the snapshot may be created without the need of stopping the operation of the virtual machine, thereby reducing the amount of data to be backed up and the occupied storage space for creating the snapshot, and reducing the network bandwidth occupation for uploading the snapshot. Moreover, after the preceding creation of the snapshot of the virtual machine is failed, the top file renamed during the preceding creation is combined with the top file renamed during the current creation, and the combined file is uploaded to the file management server, thereby avoiding omitting the snapshot data. In addition, the snapshot of the virtual machine may also be created in the power-off state of the virtual machine, thereby improving the efficiency of creating the snapshot of the virtual machine.

Figure 4:
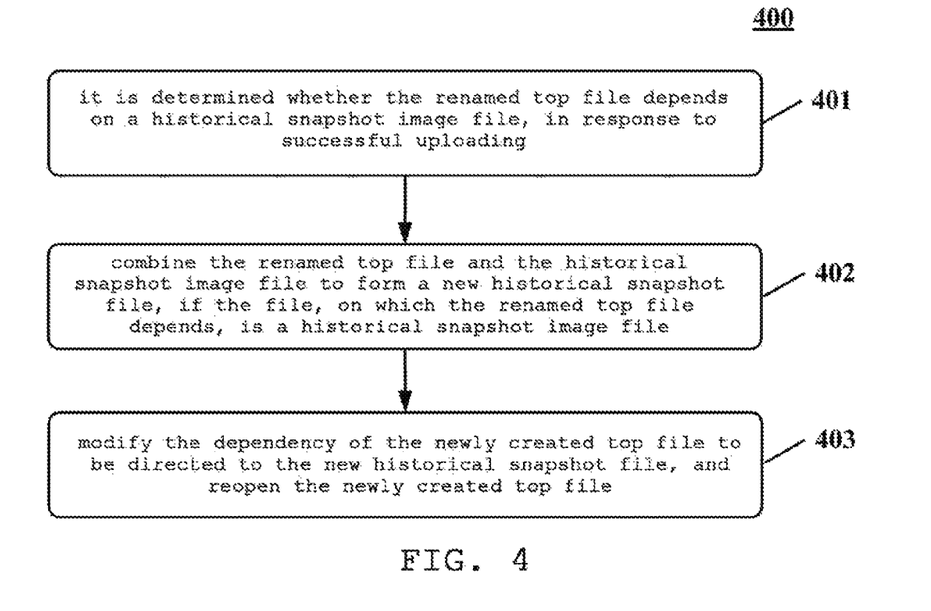
FIG. 4 shows a schematic flowchart of a process for combining system disk files according to an embodiment of the present application.

FIG. 4 illustrates a schematic flowchart of a process for combining system disk files according to an embodiment of the present application. As shown in FIG. 4, on the basis of the method for creating the system disk snapshot of the virtual machine, a process 400 for combining system disk files includes the following steps.

In step 401, it is determined whether the renamed top file depends on a historical snapshot file, in response to successful uploading.

In this embodiment, the virtual machine management module, on which the method for creating the system disk snapshot of the virtual machine is performed, invokes a virtual machine virtualization technology interface to perform the following operation: determining whether the renamed top file depends on a historical snapshot file, in response to successful uploading of the first snapshot file or the second snapshot file.

When it is determined whether the renamed top file depends on a historical snapshot file, a unique identifier of the file, on which the renamed top file depends, may be extracted; it is determined whether the unique identifier exists in a snapshot list of a database of the uploaded files; and it is determined that the renamed top file depends on a historical snapshot file, if the unique identifier exists.

In step 402, if the file, on which the renamed top file depends, is a historical snapshot file, the renamed top file and the historical snapshot file are combined to form a new historical snapshot file.

In this embodiment, in order to prevent the link length from being too long to impact the read and write performance and occupy excessive physical machine disk space, the virtual machine management module needs to combine existing system disk files to ensure that the link length is in a certain range. Therefore, when the virtual machine management module acquires the link length of the system disk file and determines that the link length is greater than 3, that is, when the system disk files include a historical snapshot file in addition to the base file, the renamed top file and the newly created top file, the renamed top file and the historical snapshot file may be combined to obtain a new historical snapshot file.

In some alternative implementations of this embodiment, the combining of the renamed top file with the historical snapshot file to form a new historical snapshot file comprises: backing up the renamed top file and the historical snapshot file as source files; determining whether dependency relationship of the backed up files and dependency relationship of the source files comply with each other; modifying the dependency relationship of the backed up files to comply with the dependency relationship of the source files, if the dependency relationships do not comply with each other; combining the backed up files to obtain the new historical snapshot file, if the dependency relationships comply with each other; and deleting the source files, that is, deleting the renamed top file and the historical snapshot file.

In step 403, the dependency of the newly created top file is modified to be directed to the new historical snapshot file, and the created new top file is reopened.

In this embodiment, after obtaining the new historical snapshot file, the virtual machine management module modifies the dependency of the newly created top file to be directed to the new historical snapshot file, and reopens the newly created top file by invoking the application programming interface of a function library supporting the virtualization technology to invoke the virtual machine process.

In this embodiment, the link length of the system disk files may be controlled to be less than or equal to 4, so as to avoid performance loss caused by an excessive link length.

Figure 5:
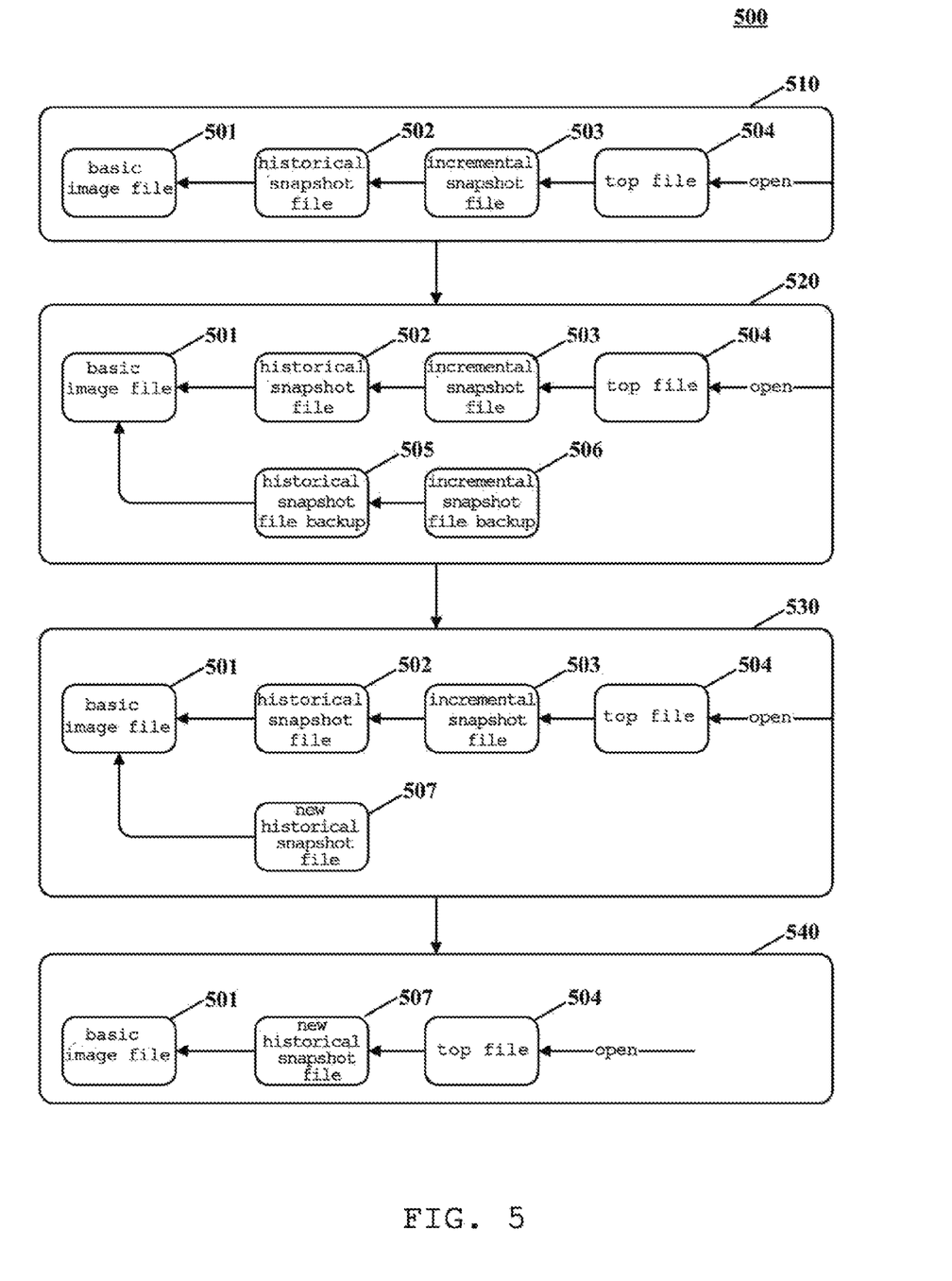
FIG. 5 shows a schematic flow chart 500 of an application scenario of a process for combining the renamed top file and a historical snapshot file to form a new historical snapshot file according to an embodiment of the present application.

FIG. 5 shows a schematic flow chart 500 of an application scenario of a process for combining the renamed top file and a historical snapshot file to form a new historical snapshot file according to an embodiment of the present application.

As shown in FIG. 5, in a first link structure 510 of the system disk files, the historical snapshot file exists in the form of a historical snapshot file 502 in the link structure, the renamed top file exists in the form of an incremental snapshot file 503 in the link structure, and the created new top file exists in the form of a top file 504 in the link structure. In the four files including the basic image file 501, the historical snapshot file 502, the incremental snapshot file 503 and the top file 504, a file depends on its preceding file. After successfully uploading the incremental snapshot file 503 to the file management server, the virtual machine management module determines which file the incremental snapshot file 503 depends on. The obtained result of determining is that a historical snapshot file 502 exists. Then, the historical snapshot file 502 and the incremental snapshot file 503 are combined. During the combining, two backup files, namely, a historical snapshot file backup 505 and an incremental snapshot file backup 506, are generated first to obtain a second link structure 520. It is then checked whether the dependency between the historical snapshot file backup 505 and incremental snapshot file backup 506 and the basic image file 502 is consistent with the dependency in the original link structure. If yes, the historical snapshot file backup 505 and the incremental snapshot file backup 506 are combined to generate a new historical snapshot file 507, so as to obtain a third link structure 530. Then, the dependency of the top file 504 is modified to be directed to the new historical snapshot file 507, and the top file 504 is reopened, so as to obtain a fourth link structure 540. Therefore, the virtual machine management module implements the control on the link length of the system disk file structure.

Returning to FIG. 4, it may be seen from FIG. 4 that the process 400 of the method for creating the system disk snapshot of the virtual machine in this embodiment emphasizes the control on the link length of the system disk files, compared with the embodiment corresponding to FIG. 2. Therefore, the combination of the snapshot files may be introduced into the solution described in this embodiment, thereby reducing the link length of the system disk files, improving the read and write performance of the virtual machine, and reducing the occupancy on the physical machine disk space.

Figure 6:
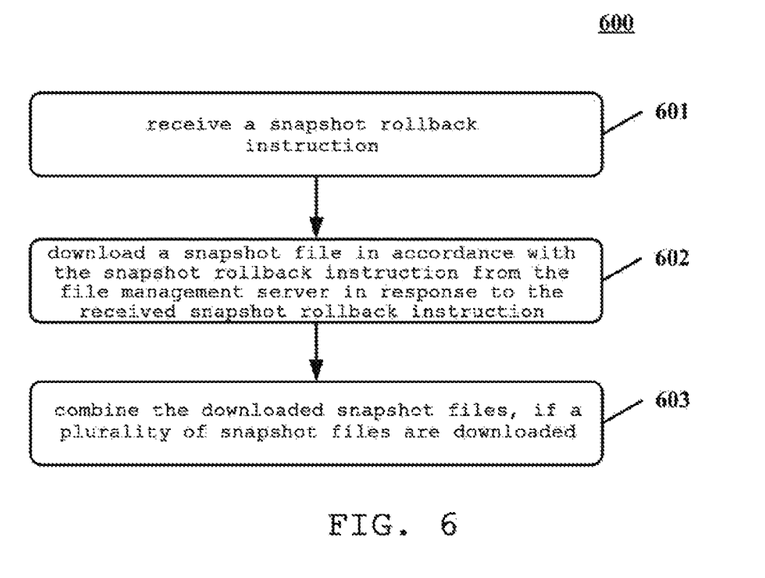
FIG. 6 shows a schematic flowchart of a process for combining downloaded snapshot files during the snapshot rollback according to an embodiment of the present application.

FIG. 6 illustrates a schematic flowchart of a process for combining downloaded snapshot files during the snapshot rollback according to an embodiment of the present application. On the basis of the method for creating the system disk snapshot of the virtual machine, the process 600 of the method for creating the system disk snapshot of the virtual machine further includes the following steps.

In step 601, a snapshot rollback instruction is received.

In this embodiment, the virtual machine management module may directly and/or indirectly receive a snapshot rollback instruction input by a user. The instruction includes a universally unique identifier of a snapshot used for rollback. The snapshot file required for the rollback may be uniquely determined according to the universally unique identifier, and the time information of the rollback is determined according to the uniquely determined snapshot file.

In some alternative implementations of this embodiment, the indirectly receiving of the snapshot rollback instruction may be implemented by the following steps: presenting an interface for selecting a rollback instruction; receiving a first selection operation on the rollback instruction; presenting an interface for selecting a rollback time in response to the received first selection operation; and receiving a second selection operation on the rollback time. Since the rollback time points correspond to the snapshot files on a one to one basis, the snapshot files and the universally unique identifiers of the snapshot files can be uniquely determined by using the rollback time information.

In this embodiment, a first selecting operation and a second selecting operation are merely operations performed on two different operation objects. The first selecting operation refers to an operation on the rollback instructions, and the second selecting operation refers to an operation on the rollback time points. These operations may be implemented in suitable respective operations. The selected operations may be identical or different. The skilled in the art should understand that, the terms "first" and "second" are not intended to specifically limit the selecting operations.

In step 602, a snapshot file in accordance with the snapshot rollback instruction is downloaded from the file management server in response to the received snapshot rollback instruction.

In this embodiment, the virtual machine management module may determine the snapshot file to be downloaded from the file management server according to the universally unique identifier of the snapshot.

In some alternative implementations of this embodiment, the downloading of a snapshot file in accordance with the snapshot rollback instruction from the file management server, in response to the received snapshot rollback instruction includes: downloading a snapshot file in accordance with the second selection operation from the file management server, in response to the received second selection operation.

In step 603, the downloaded snapshot files are combined, if a plurality of snapshot files are downloaded.

In this embodiment, the virtual machine management module combines the downloaded snapshot files when a plurality of snapshot files are downloaded, so as to ensure that the link length of the system disk file structure is kept in a suitable range.

The above embodiments of the present application reduces the occupancy on the physical machine disk space, and improves the read and write performance of the virtual machine.

Figure 7:
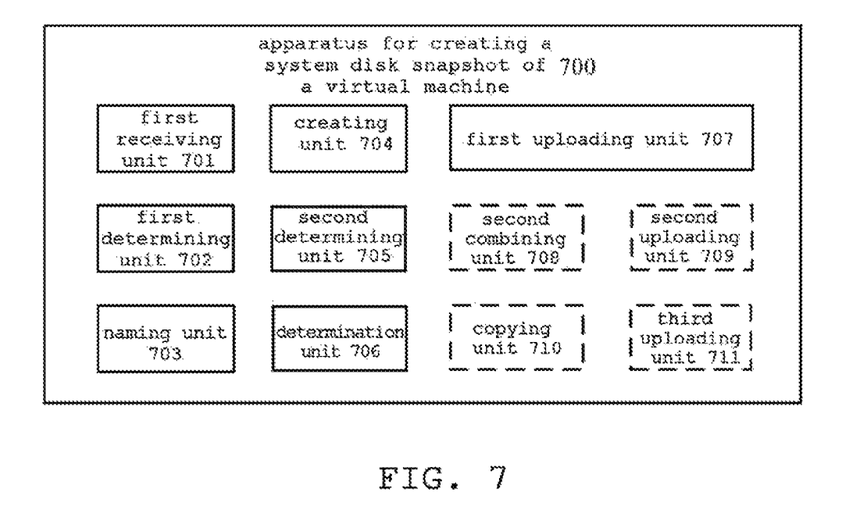
FIG. 7 shows an exemplary structure of an apparatus for creating a system disk snapshot of a virtual machine according to an embodiment of the present application.

FIG. 7 as an implementation of the methods shown in the drawings shows an exemplary structure of an apparatus for creating a system disk snapshot of a virtual machine according to an embodiment of the present application. The apparatus of the embodiment is corresponding to the method of the embodiment shown in FIG. 2, and the apparatus is applicable to the virtual machine management module in the cloud computing platform architecture (for example, set in the virtual machine management module in the server shown in FIG. 1).

As shown in FIG. 7, an apparatus 700 for creating a system disk snapshot of a virtual machine according to this embodiment may include, but not limited to: a first receiving unit 701, a first determining unit 702, a naming unit 703, a creating unit 704, a second determining unit 705, a determination unit 706, and an uploading unit 707.

The first receiving unit 701 is configured to receive an instruction for creating a snapshot of a virtual machine.

In this embodiment, the first receiving unit 701 operating in the virtual machine management module may receive an instruction for creating a virtual machine snapshot from a user using a terminal with which a virtual machine snapshot is created, generally through a wired or a wireless connection. The instruction for creating the virtual machine snapshot may include a universally unique identifier (UUID) of the virtual machine, so as to indicate which virtual machine running on the cloud computing platform the virtual machine snapshot is created for.

Generally, when the user submits an instruction for creating a virtual machine snapshot to the first receiving unit 701 by using a web page browser or a client application installed on a terminal, the instruction for creating the virtual machine snapshot may be submitted to the virtual machine management module by directly inputting the instruction or clicking a link presented by the web page browser or the client application.

The first determining unit 702 is configured to determine whether the virtual machine is in a power-on state.

In this embodiment, the first determining unit 702 operating in the virtual machine management module determines whether the virtual machine is in the power-on state, in response to the received instruction for creating. For example, the first determining unit in a Nova-compute computing component operating in an OpenStack cloud computing management platform architecture processes a request for creating a virtual machine snapshot of an application programming interface (API), which is sent by a terminal. The request does not differentiate between the power-off snapshot and the power-on snapshot. The first determining unit determines, through the state of an instance (namely, a virtual machine), whether the snapshot is a power-off snapshot or a power-on snapshot. If it is a power-off snapshot, a power-off snapshot interface is invoked to perform a cold-snapshot. If it is a power-on snapshot, a virtual machine interface is invoked to perform a live-snapshot.

The naming unit 703 is configured to rename a top file in files of a system disk of the virtual machine in response to the received instruction if the virtual machine is in the power-on state.

In this embodiment, the files in the system disk of the virtual machine have a linked structure. Generally, the files of the system disk include at least a base file and a top file, and may also include historical snapshot files between the base file and the top file. The base file refers to an original system installation file of the virtual machine or an incremental file generated by adding a system patch to the original system installation file, that is, an image file of the virtual machine.

When the naming unit 703 acquires the determining result from the first determining unit 702 that the virtual machine is in the power-on state and receives an instruction for creating a virtual machine snapshot, it is possible that an input/output port is performing a continuous writing. Then, the top file in files in the system disk of the virtual machine may be renamed by the naming unit 703 operating in the virtual machine management module. For example, when a qemu-kvm type virtual machine process is running continuously, an opened device file is still a qcow2 file before the snapshot process. If it is needed to be switched to a new incremental differential file, the naming unit in a nova-compute may be used to modify an opened file descriptor, so as to rename the top file named "disk".

The creating unit 704 is configured to create a new top file in response to completion of renaming the top file, to direct the dependency of the newly created top file to the renamed top file, and to open the created new top file.

In this embodiment, in response to the completion of renaming the top file, the creating unit 704 operating in the virtual machine management module may invoke a virtualization technology interface of the virtual machine to generate a new top file, invoke the virtualization technology interface of the virtual machine to modify the dependency of the newly created top file to direct to the renamed top file, and then invoke the virtualization technology interface of the virtual machine to open the created new top file. For example, the creating unit operating in the above-mentioned Nova-compute may create a new top file by invoking an API of a libvirt, modify the dependency of the created top file to direct to the renamed top file by invoking the API of the libvirt, and then implement a reopen command to open the created disk file by invoking the API of the libvirt. The libvirt is a C function library that is free and open-source and supports mainstream virtualization tools in Linux.

The second determining unit 705 is configured to determine whether a preceding snapshot is created successfully.

In this embodiment, the second determining unit 705 operating in the virtual machine management module may upload a first snapshot file to a file management server. The file management server may be one of the servers forming the cloud computing platform, and used to store and manage the generated snapshot files.

In some alternative implementations of this embodiment, the second determining unit 705 may include, but not limited to: an extracting sub-unit, a determining sub-unit, a first determining sub-unit and a second determining sub-unit (not shown).

The extracting sub-unit is configured to extract a unique identifier of each depended files.

The determining sub-unit is configured to determine whether the unique identifier exists in a snapshot list of a database of the uploaded files.

The first determining sub-unit is configured to determine that the preceding snapshot is created successfully, if the unique identifier exists in the snapshot list of the database of the uploaded files.

The second determining sub-unit is configured to determine that the preceding snapshot is created unsuccessfully, if the unique identifier does not exist in the snapshot list of the database of the uploaded files.

The determination unit 706 is configured to use the renamed top file as a first snapshot file if the preceding snapshot is created successfully.

The first uploading unit 707 is configured to upload the first snapshot file to a file management server.

Alternatively, the apparatus 700 for creating a system disk snapshot of a virtual machine may further include, but not limited to: a second combining unit 708 and a second uploading unit 709.

The second combining unit 708 is configured to combine the renamed top file generated during creation of the preceding snapshot with the renamed top file generated during creation of the current snapshot to form a second snapshot file, if it is determined that the preceding snapshot is created unsuccessfully.

After the preceding snapshot of the virtual machine is created unsuccessfully, since the process of reopening the top file by the virtual machine is completed and the virtual machine is running, the link structure will not be returned to ensure the non-awareness of the user. To avoid omitting the data regarding the preceding virtual machine snapshot creation, in response to the currently received instruction to create the virtual machine snapshot, the second combining unit 708 operating in the virtual machine management module may check whether the preceding virtual machine snapshot is created successfully through the following steps: extracting a UUID from the name of each dependent file; searching in a database snapshot list to determine whether the UUID exists; the preceding online snapshot process is successful if the UUID exists, otherwise the preceding online snapshot is failed; combining the previously failed snapshot file with the currently created virtual machine snapshot file if it is determined that the preceding online snapshot is failed, and using a second snapshot file obtained through the combination as the snapshot data to be uploaded.

The second uploading unit 709 is configured to upload the second snapshot file to the file management server.

The second uploading unit 709 uploads the second snapshot file to the file management server, in response to acquiring the second snapshot file.

Alternatively, the apparatus 700 for creating a system disk snapshot of a virtual machine may further include, but not limited to: a copying unit 710 and a third uploading unit 711.

The copying unit 710 is configured to copy the top file in the files of the system disk of the virtual machine to obtain a third snapshot file, in response to the received instruction, if the virtual machine is powered off.

When the copying unit 710 operating in the virtual machine management module acquires the determining result from the first determining unit 702 that the virtual machine is powered off, the top file in the image files of the virtual machine is copied, so as to obtain the third snapshot file.

The third uploading unit 711 is configured to upload the third snapshot file to the file management server.

The third uploading unit 711 operating in the virtual machine management module acquires the third snapshot file first, and then uploads the third snapshot file to the file management server.

The skilled in the art may understand that the apparatus 700 for creating a system disk snapshot of a virtual machine may further include some other well-known structures, such as a processor and a memory, and these well-known structures are not shown in FIG. 7 to avoid unnecessarily obscuring the embodiment of the present disclosure.

Alternatively, the apparatus for creating a system disk snapshot of a virtual machine may further include, but not limited to: a third determining unit, a first combining unit and a modifying unit (not shown).

The third determining unit is configured to determine whether the renamed top file depends on a historical snapshot file, in response to successful uploading.

The third determining unit operating in the virtual machine management module invokes a virtual machine virtualization technology interface to perform the following operation: determining whether the renamed top file depends on a historical snapshot file, in response to successful uploading of the first snapshot file or the second snapshot file.

When it is determined whether the renamed top file depends on a historical snapshot file, a unique identifier of the file, on which the renamed top file depends, may be extracted; it is determined whether the unique identifier exists in a snapshot list of a database of the uploaded files; and it is determined that the renamed top file depends on a historical snapshot file, if the unique identifier exists.

The first combining unit is configured to combine the renamed top file with the historical snapshot file to form a new historical snapshot file, if the renamed top file depends on the historical snapshot file.

In order to prevent the link length from being too long to impact the read and write performance and occupy excessive physical machine disk space, the first combining unit operating in the virtual machine management module needs to combine existing system disk files to ensure that the link length is in a certain range. Therefore, when the virtual machine management module acquires the link length of the system disk file and determines that the link length is greater than 3, that is, when the system disk files include a historical snapshot file in addition to the base file, the renamed top file and the created new top file, the renamed top file and the historical snapshot file may be combined to obtain a new historical snapshot file.

In some implementations, the first combining unit may include, but not limited to: a backing up sub-unit, configured to back up the renamed top file and the historical snapshot file as source files; a determining sub-unit, configured to determine whether dependency relationship of the backed up files and dependency relationship of the source files comply with each other; a modifying sub-unit, configured to modify the dependency relationship of the backed up files to comply with the dependency relationship of the source files, if the dependency relationship of the backed up files does not comply with that of the source files; a combining sub-unit, configured to combine the backed up files to obtain the new historical snapshot file, if the dependency relationship of the backed up files complies with that of the source files; and a first uploading unit, configured to upload the first snapshot file to a file management server, that is, delete the renamed top file and the historical snapshot file.

The modifying unit is configured to modify the dependency of the newly created top file to be directed to the new historical snapshot file, and to reopen the created new top file.

Alternatively, the apparatus for creating a system disk snapshot of a virtual machine may further include, but not limited to: a second receiving unit, a downloading unit and a third combining unit (not shown).

The second receiving unit is configured to receive a snapshot rollback instruction.

The second receiving unit operating in the virtual machine management module may directly and/or indirectly receive a snapshot rollback instruction input by a user. The instruction includes a universally unique identifier of a snapshot used for rollback. The snapshot file required for the rollback may be determined uniquely according to the universally unique identifier, and the time information of the rollback is determined according to the uniquely determined snapshot file.

In some implementations, in order to implement that the second receiving unit indirectly receives the snapshot rollback instruction input by the user, the second receiving unit may include, but not limited to: a first presenting sub-unit, configured to present an interface for selecting a rollback instruction; a first receiving sub-unit, configured to receive a first selection operation on the rollback instruction; a second presenting sub-unit, configured to present an interface for selecting a rollback time in response to the received first selection operation; and a second receiving sub-unit, configured to receive a second selection operation on the rollback time.

The downloading unit is configured to download a snapshot file in accordance with the snapshot rollback instruction from the file management server, in response to the received snapshot rollback instruction.

The downloading unit operating in the virtual machine management module may determine the snapshot file to be downloaded from the file management server, according to the universally unique identifier of the snapshot.

Corresponding to the second receiving unit in the above implementation including the first presenting sub-unit, the first receiving sub-unit, the second presenting sub-unit and the second receiving sub-unit, the downloading unit may include, but not limited to: a downloading sub-unit, configured to download a snapshot file in accordance with the second selection operation from the file management server, in response to the received second selection operation.

The third combining unit is configured to combine downloaded snapshot file, if a plurality of snapshot files are downloaded.

The third combining unit operating in the virtual machine management module combines the downloaded snapshot files when a plurality of snapshot files are downloaded, so as to ensure that the link length of the system disk file structure is kept in a suitable range.

The skilled in the art should understand that, the units recorded in the apparatus 700 are corresponding to the steps in the method described with reference to FIG. 2. Therefore, the operations and features described for the method for creating a system disk snapshot of a virtual machine are also applicable to the apparatus 700 and the units included therein, and are not repeated herein. The corresponding units in the apparatus 700 may cooperate with units in a terminal device or server to achieve the solution in the embodiments of the present application.

Figure 8:
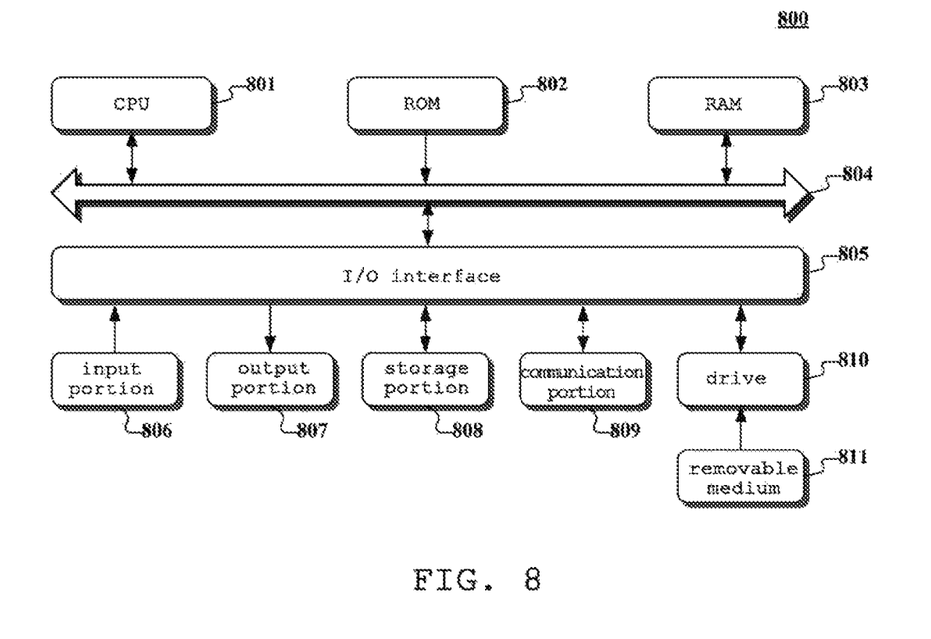
FIG. 8 shows a schematic structural diagram of a computer system 800 adapted to implement a terminal apparatus or a server of the embodiments of the present application.

Referring to FIG. 8, a schematic structural diagram of a computer system 800 adapted to implement a terminal apparatus or a server of the embodiments of the present application is shown.

As shown in FIG. 8, the computer system 800 includes a central processing unit (CPU) 801, which may execute various appropriate actions and processes in accordance with a program stored in a read-only memory (ROM) 802 or a program loaded into a random access memory (RAM) 803 from a storage portion 808. The RAM 803 also stores various programs and data required by operations of the system 800. The CPU 801, the ROM 802 and the RAM 803 are connected to each other through a bus 804. An input/output (I/O) interface 805 is also connected to the bus 804.

The following components are connected to the I/O interface 805: an input portion 806 including a keyboard, a mouse etc.; an output portion 807 comprising a cathode ray tube (CRT), a liquid crystal display device (LCD), a speaker etc.; a storage portion 808 including a hard disk and the like; and a communication portion 809 comprising a network interface card, such as a LAN card and a modem. The communication portion 809 performs communication processes via a network, such as the Internet. A drive 810 is also connected to the I/O interface 805 as needed. A removable medium 811, such as a magnetic disk, an optical disk, a magneto-optical disk, and a semiconductor memory, may be placed on the drive 810, to enable the retrieval of a computer program from the removable medium 811, and the installation thereof on the storage portion 808 as needed.

In particular, according to an embodiment of the present disclosure, the process described above with reference to FIG. 2 may be implemented in a computer software program. For example, an embodiment of the present disclosure includes a computer program product, which comprises a computer program that is tangibly embedded in a machine-readable medium. The computer program comprises program codes for executing the method of FIG. 2. In such an embodiment, the computer program may be downloaded and installed from a network via the communication portion 809, and/or may be installed from the removable media 811.

The flow charts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a first receiving unit, a first determining unit, a naming unit, a creating unit, a second determining unit, a determination unit and a first uploading unit, where the names of these units or modules are not considered as a limitation to the units or modules. For example, the first receiving unit may also be described as "a unit for determining whether the virtual machine is in the power-on state".

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. When the one or more programs are executed by a device, the device is to: receive an instruction for creating a snapshot of a virtual machine; determine whether the virtual machine is in a power-on state; rename a top file in files of a system disk of the virtual machine in response to the received instruction if the virtual machine is in the power-on state; create a new top file in response to completion of renaming the top file, directing the dependency of the newly created top file to the renamed top file, and opening the created new top file; determine whether a preceding snapshot is created successfully; use the renamed top file as a first snapshot file if the preceding snapshot is created successfully; and uploading the first snapshot file to a file management server.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for creating a snapshot of a system disk of a virtual machine, comprising:
   receiving an instruction for creating a current snapshot of a virtual machine;
   in response to the virtual machine being in a power-on state, renaming a top level file in qcow2 format in files of the system disk of the virtual machine in response to the received instruction to generate a current incremental snapshot file, comprising: renaming the top level file in qcow2 format by modifying a file descriptor of the top level file in qcow2 format to generate the current incremental snapshot file;
   creating a new top level file in qcow2 format in response to completion of renaming the top level file, directing a dependency of the created new top level file to the current incremental snapshot file, and opening the created new top level file, wherein the renamed top level file is a read-only file after the opening the created new top level file;
   determining whether a preceding snapshot is created successfully;
   in response to determining that the preceding snapshot is created successfully, using the current incremental snapshot file as a first snapshot file; and uploading the first snapshot file to a file management server; and
   in response to determining that the preceding snapshot is created unsuccessfully, combining a preceding incremental snapshot file generated during creation of the preceding snapshot with the current incremental snapshot file generated during creation of the current snapshot to form a second snapshot file; and uploading the second snapshot file to the file management server.

2. The method according to claim 1, further comprising:
   in response to determining that the uploading is successful, determining whether the current incremental snapshot file depends on a historical snapshot file;
   in response to determining that the current incremental snapshot file depends on the historical snapshot file, combining the current incremental snapshot file with the historical snapshot file to form a new historical snapshot file; and
   modifying the dependency of the created new top level file to be directed to the new historical snapshot file, and reopening the created new top level file.

3. The method according to claim 2, wherein the combining the current incremental snapshot file with the historical snapshot file to form a new historical snapshot file comprises:
   backing up the current incremental snapshot file and the historical snapshot file to obtain current incremental snapshot file backup and historical snapshot file backup, wherein the current incremental snapshot file and the historical snapshot file are psi' source files and the current incremental snapshot file backup and the historical snapshot file backup are backup files;
   determining whether dependency relationship of the backup files and dependency relationship of the source files comply with each other;
   in response to determining that the dependency relationship of the backup files and the dependency relationship of the source files do not comply with each other, modifying the dependency relationship of the backup files to comply with the dependency relationship of the source files;
   in response to determining that the dependency relationship of the backup files and the dependency relationship of the source files comply with each other, combining the backup files to obtain the new historical snapshot file; and
   deleting the source files.

4. The method according to claim 1, wherein the determining whether a preceding snapshot is created successfully comprises:
   extracting a unique identifier of each file on which the current incremental snapshot file depends;
   determining whether the unique identifier exists in a snapshot list of a database of the uploaded files;

in response to determining that the unique identifier exists in the snapshot list of the database of the uploaded files, determining that the preceding snapshot is created successfully; and in response to determining that the unique identifier does not exist in the snapshot list of the database of the uploaded files, determining that the preceding snapshot is created unsuccessfully, combining the renamed top level file generated during creation of the preceding snapshot with the renamed top level file generated during creation of the current snapshot to form a second snapshot file, in response to determining that the preceding snapshot is created unsuccessfully; and uploading the second snapshot file to the file management server.

5. The method according to claim 1, further comprising:
copying the top level file in the files of the system disk of the virtual machine to obtain a third snapshot file, in response to the received instruction, in response to determining that the virtual machine is powered off; and uploading the third snapshot file to the file management server.

6. The method according to claim 1, further comprising:
receiving a snapshot rollback instruction;
downloading a snapshot file in accordance with the snapshot rollback instruction from the file management server, in response to the received snapshot rollback instruction; and in response to determining that a plurality of snapshot files are downloaded, combining the plurality of downloaded snapshot files.

7. The method according to claim 6, wherein the receiving of a snapshot rollback instruction comprises:
presenting an interface for selecting a rollback instruction;
receiving a first selection operation on the rollback instruction;
presenting an interface for selecting a rollback time in response to the received first selection operation; and
receiving a second selection operation on the rollback time; and
the downloading of a snapshot file in accordance with the snapshot rollback instruction from the file management server, in response to the received snapshot rollback instruction comprises:
downloading a snapshot file in accordance with the second selection operation from the file management server, in response to the received second selection operation.

8. The method according to claim 7, wherein the virtual machine is a virtual machine created based on a qemu-kvm hardware virtualization technology through an opensource OpenStack cloud computing management platform architecture; and the files of the system disk of the virtual machine are in the qcow2 format and are arranged in a link structure.

9. The method according to claim 8, wherein a number of link nodes in the link structure is not greater than 4, the link nodes include a basic image file and the top level file, and further includes one or more of following files in the system disk: historical snapshot file, or the current incremental snapshot file.

10. The method according to claim 2, wherein the determining whether the current incremental snapshot file depends on a historical snapshot file comprises:

extracting a unique identifier of a file on which the current incremental snapshot file depends;
determining whether the unique identifier exists in the snapshot list of the database of the uploaded files; and
in response to determining that the unique identifier exists in the snapshot list of the database of the uploaded files, determining that the current incremental snapshot file depends on a historical snapshot file.

11. The method according to claim 1, wherein the creating a new top level file in qcow2 format in response to completion of renaming the top level file, directing a dependency of the created new top level file to the current incremental snapshot file, and opening the created new top level file, comprises:
a Nova-compute component in an OpenStack cloud computing management platform architecture creates the new top level file in qcow2 format by invoking an API of a libvirt, directs a dependency of the created new top level file to the current incremental snapshot file by invoking the API of the libvirt, and implements a reopen command to open the created disk file by invoking the API of the libvirt.

12. An apparatus for creating a snapshot of a system disk of a virtual machine, comprising:
at least one processor; and
a memory storing instructions, the instructions when executed by the at least one processor, cause the at least one processor to perform operations, the operations comprising:
receiving an instruction for creating a current snapshot of a virtual machine;
in response to the virtual machine being in a power-on state, renaming a top level file in qcow2 format in files of the system disk of the virtual machine in response to the received instruction to generate a current incremental snapshot file, comprising: renaming the top level file in qcow2 format by modifying a file descriptor of the top level file in qcow2 format to generate the current incremental snapshot file;
creating a new top level file in qcow2 format in response to completion of renaming the top level file, to direct dependency of the created new top level file to the current incremental snapshot file, and opening the created new top level file, wherein the renamed top level file is a read-only file after the opening the created new top level file;
determining whether a preceding snapshot is created successfully;
in response to determining that the preceding snapshot is created successfully, using the current incremental snapshot file as a first snapshot file; and uploading the first snapshot file to a file management server; and
in response to determining that the preceding snapshot is created unsuccessfully, combining a preceding incremental snapshot file generated during creation of the preceding snapshot with the current incremental snapshot file generated during creation of the current snapshot to form a second snapshot file; and uploading the second snapshot file to the file management server.

13. The apparatus according to claim 12, wherein the operations further comprise:
in response to determining that the uploading is successful, determining whether the current incremental snapshot file depends on a historical snapshot file;
in response to determining that the current incremental snapshot file depends on the historical snapshot file, combining the current incremental snapshot file with the historical snapshot file to form a new historical snapshot file; and modifying the dependency of the created new top level file to be directed to the new historical snapshot file, and to reopen the created new top level file.

14. The apparatus according to claim 13, wherein the combining the current incremental snapshot file with the historical snapshot file to form a new historical snapshot file comprises:

backing up the current incremental snapshot file and the historical snapshot file to obtain current incremental snapshot file backup and historical snapshot file backup, wherein the current incremental snapshot file and the historical snapshot file are source files and the current incremental snapshot file backup and the historical snapshot file backup are backup files;

determining whether dependency relationship of the backup files and dependency relationship of the source files comply with each other;

in response to determining that the dependency relationship of the backup files and the dependency relationship of the source files do not comply with each other, modifying the dependency relationship of the backup files to comply with the dependency relationship of the source files;

in response to determining that the dependency relationship of the backup files and the dependency relationship of the source files comply with each other, combining the backup files to obtain the new historical snapshot file; and deleting the source files.

15. The apparatus according to claim 12, wherein the determining whether a preceding snapshot is created successfully comprises:

extracting a unique identifier of each file on which the current incremental snapshot file depends;

determining whether the unique identifier exists in a snapshot list of a database of the uploaded files;

in response to determining that the unique identifier exists in the snapshot list of the database of the uploaded files, determining that the preceding snapshot is created successfully; and in response to determining that the unique identifier does not exist in the snapshot list of the database of the uploaded files, determining that the preceding snapshot is created unsuccessfully.

16. The apparatus according to claim 12, wherein the operations further comprise:

copying the top level file in the files of the system disk of the virtual machine to obtain a third snapshot file, in response to the received instruction, in response to determining that the virtual machine is powered off; and uploading the third snapshot file to the file management server.

17. The apparatus according to claim 12, wherein the operations further comprise:

receiving a snapshot rollback instruction;

downloading a snapshot file in accordance with the snapshot rollback instruction from the file management server, in response to the received snapshot rollback instruction; and in response to determining that a plurality of snapshot files are downloaded, combining the plurality of downloaded snapshot files.

18. The apparatus according to claim 17, wherein the receiving of a snapshot rollback instruction comprises:

presenting an interface for selecting a rollback instruction;

receiving a first selection operation on the rollback instruction;

presenting an interface for selecting a rollback time in response to the received first selection operation; and receiving a second selection operation on the rollback time; and the downloading of a snapshot file in accordance with the snapshot rollback instruction from the file management server, in response to the received snapshot rollback instruction comprises:

downloading a snapshot file in accordance with the second selection operation from the file management server, in response to the received second selection operation.

19. The apparatus according to claim 18, wherein the virtual machine in the apparatus is a virtual machine created on basis of a qemu-kvm hardware virtualization technology through an open-source OpenStack cloud computing management platform architecture; and the files of the system disk of the virtual machine in the apparatus are in the qcow2 format and are arranged in a link structure.

20. The apparatus according to claim 19, wherein a number of link nodes in the link structure is not greater than 4, the link nodes include a basic image file and the top level file, and further includes one or more of following files in the system disk: historical snapshot file, or the current incremental snapshot file.

* * * * *